June 20, 1961 C. D. NITCHIE 2,989,328
AIR OPERATED KEYS

Filed July 18, 1958 2 Sheets-Sheet 1

INVENTOR.
CHARLES D. NITCHIE.
BY Oscar B. Brumbach
his ATTORNEY

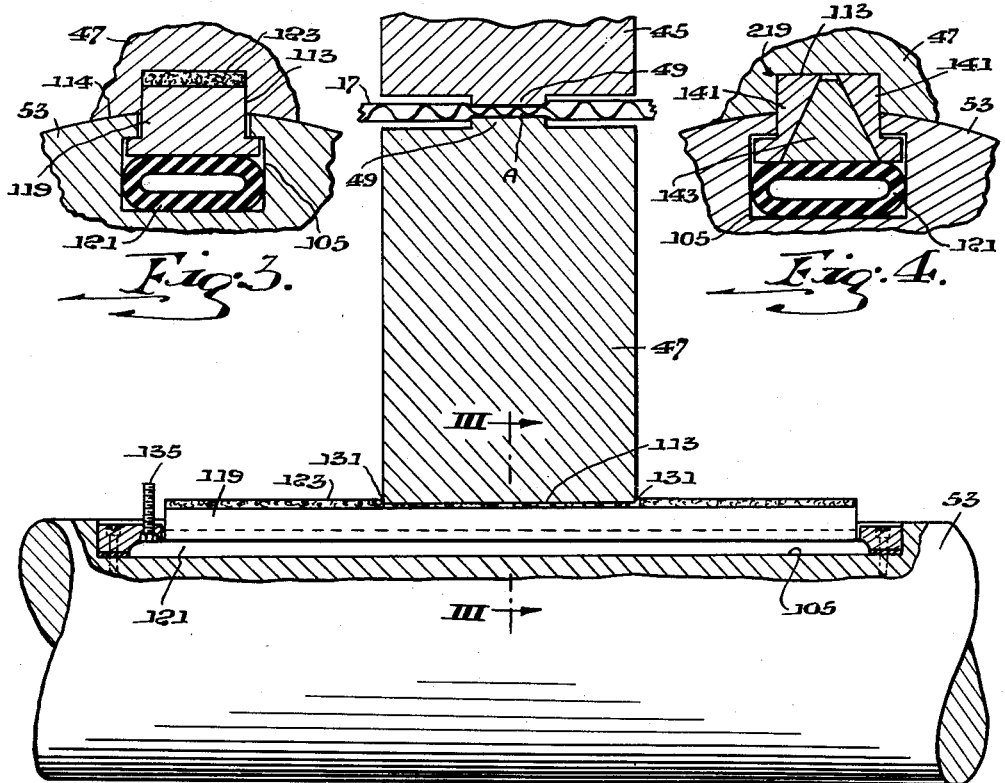
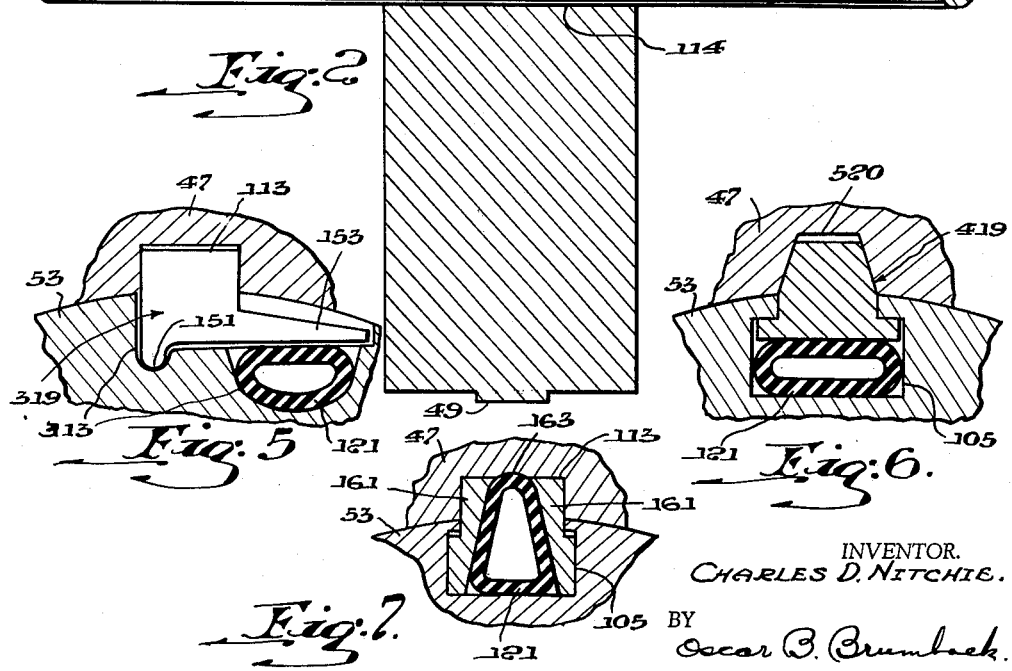

United States Patent Office

2,989,328
Patented June 20, 1961

2,989,328
AIR OPERATED KEYS
Charles D. Nitchie, Baltimore, Md., assignor to Koppers Company, Inc., a corporation of Delaware
Filed July 18, 1958, Ser. No. 749,479
15 Claims. (Cl. 287—52.05)

This invention relates to an apparatus for maintaining a pair of elements in spaced relation and more particularly to an apparatus for selectively maintaining said elements in spaced relation whereby the spacing of said elements can be adjusted quickly and easily.

In machines of many types, there exists a necessity for adjustably and selectively positioning a plurality of first elements such as rotatable working members in spaced relation on second elements such as shafts or bars. One example of such a machine is the printer-slotter machine which is used to work corrugated board into finished blanks which fold into boxes. In this machine, a plurality of spaced apart first scoring heads having scoring ridges are mounted on a first rotating shaft and cooperate with a plurality of spaced apart second scoring heads that have scoring ridges and that are mounted on a second tangentially opposed rotating shaft. The board passes between these first and second cooperating heads so that the scoring ridges compress the board at predetermined locations along the board as it moves tangentially through the machine. Thereafter, cooperating slotter heads, which are mounted in like manner so as to be tangentially opposed, slot the board along the scored portions at both ends of the board to make finished blanks for folding into boxes.

Conventionally, set or clamping screws have been used to hold the first and second heads in spaced relation on the rotating shafts so that the distance along a shaft between the scoring heads mounted thereon remained fixed. Thus, the space between scored portions on the board remained fixed for a run of box blanks of one size; and to change the size of boxes for the next run, the spacing between the scored portions on the board has had to be changed. This required that the holding screws had to be loosened, the first and second heads had to be moved laterally along the shafts and the screws had to be tightened again to hold the heads in a selected position on their supporting shafts at new locations. Heretofore, moving the first and second working heads has been a time consuming operation. It has also been found that this operation has been one in which careless operators have damaged or distorted the heads causing eccentricity and breakage.

This invention provides means for simultaneously releasing first elements and second elements and simultaneously relocking the first and second elements in spaced relation after the first elements have been moved to desired positions in relation to the second elements. More particularly, this invention provides means for exerting an axial force between a shaft and a working element mounted thereon so as to lock the shaft and the working elements in selected positions in relation to each other.

The above and further novel features of the invention will appear more fully from the following detailed description when the same is read in connection with the accompanying drawing. It is to be expressly understood, however, that the drawings are not intended as a definition of the invention but are for the purpose of illustration only.

FIG. 2 is a partial cross section and elevation of the apparatus of this invention.

FIG. 3 is a partial cross section of FIG. 2 taken through 3—3.

FIG. 4 is another embodiment of the elements of FIG. 3.

FIG. 5 is another embodiment of the elements of FIG. 3.

FIG. 6 is another embodiment of the elements of FIG. 3.

FIG. 7 is another embodiment of the elements of FIG. 3.

Figure 1:
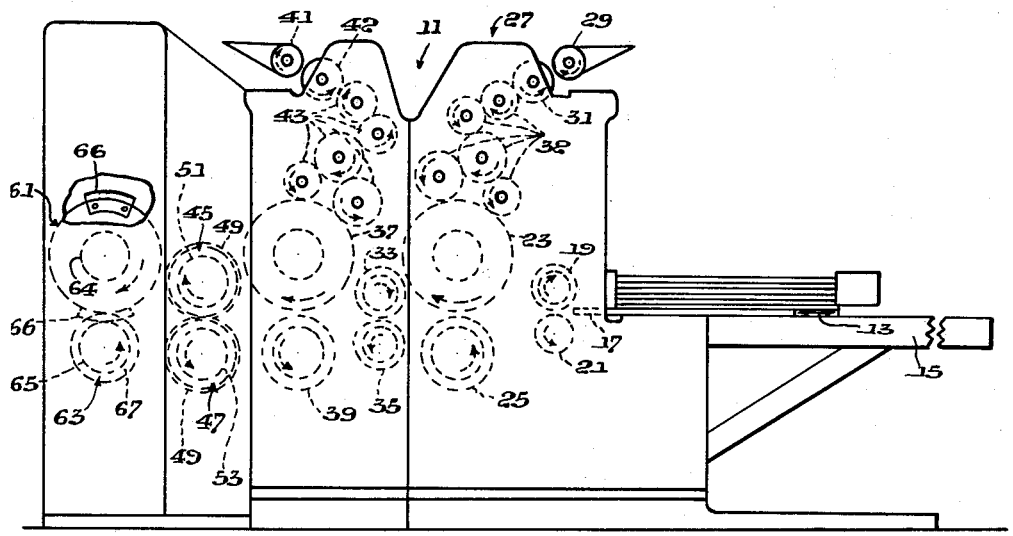
FIG. 1 is a partial cross section and elevation of a printer slotter machine embodying this invention.

For the purpose of description, an embodiment of the invention is illustrated in FIG. 1 as being incorporated in a printer slotter machine 11, similar to that described in U.S. Patent No. 2,191,988, for use in the production of shipping containers made of corrugated board. Such a machine includes a conventional reciprocating feed mechanism 13 which may be mounted on a table 15 and which sequentially feeds, at predetermined intervals, sheets of corrugated blanks 17 precut to the proper length and hereafter referred to as a board, in a substantially horizontal plane to conventional driven pull rollers 19 and 21. A conventional power source (not shown) rotates rollers 19 and 21 and printing cylinders 23 and 25. Rollers 19 and 21 grip the board by compression and evenly feed the board to the printing cylinders 23 and 25 at the same surface speed as the peripheral surface speed of the printing cylinders.

Printing cylinder 23 carries, on its periphery, dies (not shown) which are inked from a suitable ink source (not shown) through a roller stack 27. To this end a roller 29 conventionally picks up ink by oscillating back and forth into the ink source or vat and alternately applies ink to a roller 31 which applies ink to an adjacent inking roller 32 that evens the ink so applied to it by roller cooperation with the next adjacent inking roller 32 and then to cylinder 23. Roller stack 27 thus evenly applies ink to the dies mounted on the top of printing cylinder 23. Roller 25 then presses the board against the dies to print the board.

By means of the conventional drive mentioned and mounting therefor (not shown) the feed 13 is coordinated with the rotation of printing cylinder 23 in a conventional manner so that printing cylinder 23 registers the printing on the board 17 at the desired location. Thereafter, the printed board is fed through other similar pull rollers 33 and 35 and other similar printing cylinders 37 and 39. Cylinder 37 carries a die (not shown) and inking rollers 41, 42, and 43 apply ink thereto in a like manner for the printing of another color on the board 17, if desired. Conventional drive and supporting means (not shown) rotate these latter pull rollers and printing cylinders in coordination with the rotation of printing cylinder 23 for the proper printing registration on the board 17.

Figure 8:
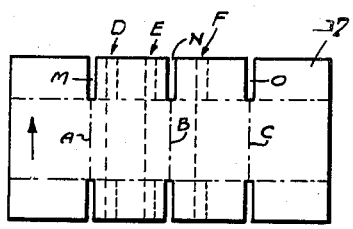
FIG. 8 is a top view of material which has been worked by the machine of FIG. 1.

Subsequently, two tangentially opposed rotatable creasing rollers 45 and 47, each having narrow edges 49 (FIGS. 1 and 2), score the printed board by compression. Shaft 51 drives rollers 45 and shaft 53 drives roller 47 by means of a conventional power source (not shown) at the same surface speed as the board fed thereto. Shafts 51 and 53 also drive the other sets of tangentially opposed creasing rollers (not shown) spaced axially from rollers 45 and 47 so as to crease the board at a plurality of locations A, B, and C (FIG. 8).

After scoring, the board 17 is slotted at appropriate places along the scored portions of the board by tangentially opposed top and bottom slotter heads 61 and 63. These slotter heads are located on shafts 64 and 65, respectively, which by means of suitable drive means, rotate the slotter heads. The top slotter head 61 carries a fixed knife blade or blades 66 attached to the periphery of top slotter heads as by set screws. As the blades 66 rotate they nest into a receiving groove 67 provided in the periphery of the bottom head 63. The receiving groove 67 forms a cooperating receiving cutter for the blades 66. The blades rotate in timed relation to the rotation of the printing cylinders 37 and 23 to register slots in the board corresponding to the length of the cuting edge of the knives. Shafts 64 and 65 also drive other pairs of tangentially opposed slotter heads spaced axially from each other in line with the scoring heads mentioned, thereby to slot the board along the scored portions of the board at M, N, and O as shown in FIG. 8 for folding into boxes.

The conventional printer-slotter machine, like that described in U.S. Patent No. 2,191,988, may be adapted easily to incorporate the apparatus of this invention and such adaptation may be made by one skilled in the art of printer-slotter machines. This overcomes the disadvantages mentioned which were present in the printer-slotter machines known heretofore and for purposes of description an embodiment of this invention is described hereinafter which is incorporated in the scoring heads and scoring shafts of a printer-slotter machine.

Referring to FIG. 2, head 47 and shaft 53 are shown as being selectively held in spaced relation in accordance with this invention. The periphery of shaft 53 has an axially located recess 105 which forms a keyway and advantageously is generally T-shaped in cross section. The cooperating head 47 has an annulus 114 which fits snugly around shaft 53. An axial recess 113 in annulus 114 registers with recess 105, and a common key 119 located in keyways 105 and 113 lock the head 47 and the shaft 53 against relative rotation. An inflatable member or tube 121 which is closed at both ends is interposed between the key 119 and the bottom of recess 105. When tube 121 is inflated, it expands to force key 119 into the keyway 113. Thus tube 121 expands to lock head 47 and shaft 53 by recess wall reaction against relative longitudinal movement from a selected position. Stated another way, the inflation of tube 121 creates an axial force by expansion between the head 47 and the shaft 53 which force resists longitudinal movement of the head 47 from a selected position along the shaft 53 (see also FIG. 3).

The movement of the key 119 into keyway 113 by the inflation of tube 121 also causes key 119 to compress a resilient strip 123 interposed between the top of the key 119 and the bottom of the recess 113. This forms shoulder-like uncompressed portions 131 of strip 123 along the sides of head 47 which cause further restraint against movement of the head 47 from a selected position longitudinally along the shaft 53.

To move the head 47 longitudinally along shaft 53, tube 121 is deflated. This removes the pressure on the bottom of key 119 which releases the compression of the resilient strip. Accordingly, after tube 121 is deflated, the head 47 can be moved longitudinally along the shaft 53; then when tube 121 is again inflated through valve 135, the head 47 and the shaft 53 are relocked in spaced relationship at the new location to which the head 47 has been moved.

In operation, tube 121 is deflated; head 47 is moved longitudinally along the shaft 53 to a desired location; then air is forced through valve 135 to inflate tube 121 so as to force the key 119 in keyway 113 against head 47 and to compress a portion of the resilient strip 123 located between the key and the head 47. This creates an axial force between the head 47 and the shaft 53 which resists relative longitudinal or lateral movement of the head and the shaft from the selected position. Moreover, this causes ridge-like bulges in the resilient strip 123 alongside the head 47 which also resists relative longitudinal or lateral movement of the head 47 from the selected position along the shaft 53. It is understood from the above that more than one scoring head may be located on shaft 53. Thus, by inflating and deflating tube 121, any or all of the heads located on shaft 53 may be moved easily and quickly along shaft 53 from the selected position.

After locking the head 47 in the desired location, feed 13 causes board 17 to be fed to pull rollers 19 and 21 in timed relation to the rotation of printing cylinder 23. The pull rollers feed the board 17 between printing cylinders 25 and 23 for printing. Thereafter pull rollers 33 and 35 feed the board to printing cylinders 37 and 39 in timed relation to the rotation of printing cylinder 37 for printing. Subsequently, the board is fed to scoring heads 45 and 47. These scoring heads 45 and 47 which are tangentially opposed, as described above, rotate at the same surface speed as the board 17 so that the raised portions on ridges 49 compress narrow band portions along the board 17 together with other scoring heads (not shown) at locations A, B, and C. Then the board is slotted by slotter heads 61 and 63 along the scored portions A, B, and C as described above.

After a run of boxes of one size has been completed, tube 121 in shaft 53 is deflated and any or all of the working scoring heads on this shaft are moved to a new desired location. The slotter heads also have to be moved, as hereinafter described, to new locations corresponding to the position of the scoring heads. Then tube 121 is reinflated to lock the working heads in spaced relation to their supporting shaft so that box blanks of a different size can be produced. Thus, for example, the board 17 is scored and slotted at D, E, and F as shown in FIG. 8.

For purposes of description, the embodiment of this invention is illustrated as being incorporated in the scoring head of a printer-slotter machine. It is understood, however, that from the above description, this invention may be adapted for use with any working element mounted on a shaft where the working element is adapted to be moved longitudinally along the shaft. For example, this invention may be adapted for incorporation by one skilled in the art of printer-slotter machines for use with the slotter heads in a printer-slotter machine such as that described in U.S. Patent No. 2,191,988.

Referring to FIG. 4, another embodiment of this invention is shown. In this embodiment the key corresponding to the key 119 of FIG. 3 is sectioned. Sections 141 fit snugly into the keyway 113 located in the working element 47 mounted on shaft 53. Inflation of tube 121 forces a wedge-like portion 143 between the two key sections 141 to cause a wedging action between the sections 141 and the head 47. This provides a spreading as well as lifting force, increasing the gripping power of the key 219.

Referring to FIG. 5, another embodiment is shown which shows a key 319 pivotable about a fulcrum 151 and inflatable tube 121 is located adjacent a projection 153 of this key 319. Thus, tube 121, upon inflation, pushes against the projection on the key to multiply the lifting force on the key thus to increase the gripping power of the key 319 against head 47.

Another embodiment is shown in FIG. 6. This embodiment is similar to the embodiment shown in FIG. 3 except that the sides of the T-shaped key 419 are tapered and the sides of the keyway 520 are tapered at complementary angles. It is to be understood that the wedge-shaped nose of the key may also be made of rubber or other resilient material.

Referring to FIG. 7, tube 121 coacts with wedges 161 which are similar to the wedges 141 shown in FIG. 4. However, in this embodiment tube 121 forms a wedge between the wedges 161 to provide both lifting and spreading forces. It is understood also that a small amount of tube 121 may bulge out between the wedges 161 at the bottom of the keyway 113 at point 163 so as to increase the force resisting relative longitudinal movement between the shaft and the element supported thereon.

It is understood that the supporting element or shaft, such as shaft 53, may be in the form of other geometrical shapes such as a triangle, rectangle, square, or octagon and may be incorporated in other types of machines than printer-slotter machines. A rectangular shaft may be especially desirable for supporting a second element in spaced relation thereto and, if this is the case, the novel apparatus of this invention may be used therewith. To this end, the supported element such as head 47 would ordinarily have a hole therein having the same geometrical shape as the shaft 53 so as to be supported snugly thereby. Thus the shaft and supported working head would be locked against relative rotation by surface reaction between the shaft and the bore of the supported head 47. The key, as actuated by an inflatable tube 121, would function to lock the shaft and supported working head against relative longitudinal or lateral movement and could be widened to do this job effectively.

It is also understood from the above description that this invention may also be arranged by one skilled in the art of printer-slotter machines so that tube 121 is inserted in the keyway in the working element and interposed between the key and the working element so as to achieve the quick adjustment advantages of this invention.

Tests have shown that the novel apparatus of this invention provides a sturdy and efficient means for locking first elements in spaced relation to second elements and embodies an improved means for quickly and easily releasing and relocking the elements in various spaced relations so that the first elements can be moved quickly from one point to another along the second element.

What is claimed is:

1. An apparatus comprising a shaft, a working member having a shaft-receiving opening mounted on said shaft, complementary keyways formed in said shaft and working member, a key disposed in said keyways, said key being movable selectively to a loose keying position wherein said working member is freely movable longitudinally and to a tight keying position wherein said working member is restrained against longitudinal movement, and inflatable means in at least one of said keyways engaging said key and being operative when deflated for positioning said key in said loose keying position and when inflated for positioning said key in said tight keying position.

2. An apparatus comprising a shaft, a working member having a shaft-receiving opening and mounted on said shaft, a first keyway formed along the periphery of said shaft-receiving opening, a second keyway formed in said shaft, a key disposed in said first and second keyways, said key being movable selectively to a loose keying position wherein said working member is freely movable longitudinally and to a tight keying position wherein said working member is restrained against longitudinal movement, and inflatable means located in at least one of said keyways engaging said key and being operative when deflated for positioning said key in said loose keying position and when inflated for positioning said key in said tight keying position.

3. The invention as defined in claim 2 in which said first keyway is formed with tapered side walls and said portion of the key accommodated therein is tapered complementary thereto.

4. The invention as defined in claim 2 in which said inflatable means is disposed in said second keyway between said key and the bottom of said keyway.

5. The invention as defined in claim 2 in which said first keyway is of substantially rectangular cross section and in which said key is provided with a compressible covering engaging the walls forming said first keyway.

6. The invention as defined in claim 2 in which said first keyway is formed of substantially rectangular cross section and in which said key comprises a central section having inwardly tapering side walls and two outer sections having inner walls complementary to said tapering side walls and outer walls contoured to fit within said first keyway.

7. The invention as defined in claim 6 in which said inflatable means is located between said central section of said key and the bottom of said second keyway.

8. The invention as defined in claim 2 in which the key comprises a pair of split members, each of said split members being engageable with one of the walls defining the first keyway and one of the walls defining the second keyway, and the inflatable means is disposed between said split members engaging the opposed bottom walls of said first and second keyways.

9. An apparatus comprising a shaft, a working member having a shaft-receiving opening and mounted on said shaft, complementary keyways formed in said shaft and working member, said keyways each being defined by two spaced side walls and a bottom wall, a key disposed in said keyways, said key being movable between said side walls selectively to a loose keying position wherein said working member is freely movable longitudinally and to a tight keying position wherein said working member is restrained against longitudinal movement, and inflatable means in at least one of said keyways engaging said key and being operative when deflated for positioning said key in said loose keying position and when inflated for positioning said key in said tight keying position.

10. An apparatus comprising a shaft, a working member having a shaft-receiving opening and mounted on said shaft, complementary keyways formed in said shaft and working member, said keyways each being defined by two spaced side walls and a bottom wall, a key disposed in said keyways, said key being movable selectively to a loose keying position wherein said working member is freely movable longitudinally and to a tight keying position wherein said working member is restrained against longitudinal movement, and inflatable means disposed in said shaft keyway between said key and said bottom wall, said inflatable means engaging said key and being operative when deflated for positioning said key in said loose keying position and when inflated for positioning said key in said tight keying position.

11. An apparatus comprising a shaft, a working member having a shaft-receiving opening and mounted on said shaft, complementary keyways formed in said shaft and working member, a key disposed in said keyways being movable selectively to a non-wedging position and to a wedging position, and inflatable means in at least one of said keyways engaging said key and being operative when deflated for positioning said key in said non-wedging position and when inflated for positioning said key in said wedging position.

12. An apparatus comprising a shaft, a working member having a shaft-receiving opening and mounted on said shaft, a first keyway substantially wedge-shaped in cross section formed along the periphery of and extending longitudinally of said shaft-receiving opening, a second keyway formed in said shaft and placed in juxtaposition with said first keyway, a key having a wedge-shaped portion disposed in said first keyway and a depending portion disposed in said second keyway, said key being movable between a non-wedging position and a wedging position, and inflatable means in at least one of said keyways engaging said key and being operative when deflated for positioning said key in said non-wedging position and when inflated for positioning said key in said wedging position.

13. Apparatus comprising a shaft, a working member having a shaft-receiving opening and mounted on said shaft, a first keyway formed in the periphery of said shaft receiving opening, a second keyway formed in said shaft, said keyways being in juxtaposition, a key disposed in said first and second keyways and having compressible means on a portion of said key disposed in said first keyway, said key being movable selectively to a loose keying position wherein said compressible means is out of substantial contact with said working element so that working member is freely movable longitudinally and to a tight keying position wherein said compressible means is compressed so that said working member is restrained against longitudinal movement, and inflatable means in said second keyway engaging said key and being operative when deflated for positioning said key in said loose keying position and when inflated for positioning said key in said tight keying position.

14. An apparatus comprising a shaft, a plurality of working members having shaft-receiving openings mounted in spaced relationship on said shaft, keyways formed in each of said shaft-receiving openings and a complementary keyway formed in said shaft, key means disposed in said keyways, said key means being movable selectively to a loose keying position wherein said working members are freely movable longitudinally and to a tight keying position wherein said working members are restricted against longitudinal movement, and inflatable means in at least one of said keyways engaging said key means and being operative when deflated for positioning said key means in loose keying position and when inflated for positioning said key means in said tight keying position.

15. An apparatus comprising a shaft, a working member having a shaft-receiving opening and mounted on said shaft, a first keyway formed along the periphery of said shaft-receiving opening, a second keyway formed in said shaft, said keyways being in juxtaposition, a key disposed in said first and second keyways, a fulcrum projection formed on said key, said key being pivotable about said fulcrum projection for selective movement to a loose keying position wherein said working member is freely movable longitudinally and to a tight keying position wherein said working member is restrained against longitudinal movement, and inflatable means located in at least one of said keyways engaging said key and being operative when deflated for pivoting said key about said fulcrum projection to said loose keying position and when inflated for pivoting said key about said fulcrum projection to said tight keying position.

References Cited in the file of this patent
UNITED STATES PATENTS 2,430,598     Barsam _____ Nov. 11, 1947